(12) United States Patent
Wu et al.

(10) Patent No.: US 12,377,854 B2
(45) Date of Patent: Aug. 5, 2025

(54) DRIVING MODE CONTROL METHOD BASED ON POWER CONSUMPTION AND FUEL CONSUMPTION, COMPUTER PROCESSING DEVICE AND STORAGE MEDIUM

(71) Applicant: GREAT WALL MOTOR COMPANY LIMITED, Hebei (CN)

(72) Inventors: Di Wu, Hebei (CN); Xuejing Yang, Hebei (CN); Song Han, Hebei (CN); Han Liu, Hebei (CN); Jun Zhang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 253 days.

(21) Appl. No.: 18/020,308

(22) PCT Filed: Aug. 10, 2021

(86) PCT No.: PCT/CN2021/111858
§ 371 (c)(1),
(2) Date: Feb. 8, 2023

(87) PCT Pub. No.: WO2022/033487
PCT Pub. Date: Feb. 17, 2022

(65) Prior Publication Data
US 2023/0303081 A1 Sep. 28, 2023

(30) Foreign Application Priority Data
Aug. 10, 2020 (CN) .......................... 202010796617.4

(51) Int. Cl.
*B60W 30/182* (2020.01)
*B60W 50/00* (2006.01)

(52) U.S. Cl.
CPC .......... *B60W 30/182* (2013.01); *B60W 50/00* (2013.01); *B60W 2050/0022* (2013.01);
(Continued)

(58) Field of Classification Search
CPC ............... B60W 30/182; B60W 50/00; B60W 2050/0022; B60W 2050/0095;
(Continued)

(56) References Cited

U.S. PATENT DOCUMENTS

2014/0330503 A1* 11/2014 Johansson ........... B60W 30/143
701/93
2018/0154895 A1 6/2018 Chae et al.
(Continued)

FOREIGN PATENT DOCUMENTS

CN 102069794 A 5/2011
CN 102735303 A 10/2012
(Continued)

*Primary Examiner* — Aniss Chad
*Assistant Examiner* — Stephanie T Su
(74) *Attorney, Agent, or Firm* — Nath, Goldberg & Meyer; Joshua B. Goldberg

(57) ABSTRACT

A driving mode control method, apparatus, device, program and storage medium, which relates to the technical field of electronic control, and is for a control platform, the method includes: acquiring a location information sent by a target vehicle, wherein the location information comprises a target location; determining a status data of at least one sample vehicle pre-stored by the control platform based on the target location, wherein the sample vehicle is a vehicle which has travelled through the target location; determining a target driving mode based on the status data of the sample vehicle, and sending the target driving mode to the target vehicle, such that the target vehicle travels in the target driving mode. This disclosure enables the target vehicle to travel in the target driving mode. The driver needs not to manually switch (Continued)

the driving mode, and the accuracy and convenience of controlling the drive mode are improved.

11 Claims, 11 Drawing Sheets

(52) U.S. Cl.
CPC . *B60W 2050/0095* (2013.01); *B60W 2556/10* (2020.02); *B60W 2556/50* (2020.02); *B60W 2556/55* (2020.02)

(58) Field of Classification Search
CPC ......... B60W 2556/10; B60W 2556/50; B60W 2556/55; B60W 2756/10; H04W 4/44; H04W 4/02; H04W 4/40; H04W 4/025; G08G 1/0129; G08G 1/0141; G08G 1/096725; G08G 1/096741; G08G 1/096775; G08G 1/096708; G08G 1/0112
See application file for complete search history.

(56) References Cited

U.S. PATENT DOCUMENTS

| | | | | |
|---|---|---|---|---|
| 2019/0301876 A1* | 10/2019 | Fryer | ...................... | G08G 1/20 |
| 2020/0134946 A1* | 4/2020 | Zhang | ................... | B60W 40/09 |

FOREIGN PATENT DOCUMENTS

| | | |
|---|---|---|
| CN | 103434509 A | 12/2013 |
| CN | 106274905 A | 1/2017 |
| CN | 108058701 A | 5/2018 |
| CN | 108399776 A | 8/2018 |
| CN | 108622080 A | 10/2018 |
| CN | 108820042 A | 11/2018 |
| CN | 110696830 A | 1/2020 |
| CN | 110920619 A | 3/2020 |
| CN | 111098856 A | 5/2020 |
| CN | 111376822 A | 7/2020 |
| CN | 111422198 A | 7/2020 |
| EP | 3489927 A1 | 5/2019 |
| KR | 20180062810 A | 6/2018 |

* cited by examiner

DRIVING MODE CONTROL METHOD BASED ON POWER CONSUMPTION AND FUEL CONSUMPTION, COMPUTER PROCESSING DEVICE AND STORAGE MEDIUM

CROSS-REFERENCE TO RELATED APPLICATIONS

This disclosure is a U.S. national phase of International Patent Application No. PCT/CN2021/111858 with an international filing date of Aug. 10, 2021, designating the U.S., and further claims the benefit of Chinese Patent Application No. 202010796617.4 filed with China National Intellectual Property Administration on Aug. 10, 2020, and the entire contents of which are incorporated herein by reference.

TECHNICAL FIELD

The present disclosure relates to the technical field of electronic control, and more particularly, relates to a driving mode control method, apparatus, device, program and storage medium.

BACKGROUND

With continuous development of electronic control technologies, vehicles have been provided with more and more driving modes for drivers to select, such as Electric Vehicle (EV) mode, Sport mode, Save mode and the like. In general, drivers manually select various driving modes via Head Unit (HUT) provided on vehicles based on their driving habits, driving experience and etc., but the operation is inconvenient and would distract the drivers. Further, an unsuitable driving mode would probably be selected for a current road condition if the drive is unfamiliar with the road condition at some location.

SUMMARY

This disclosure is intended to solve at least one of the technical problems in the related art to a certain extent.

To this end, a first purpose of this disclosure is to provide a driving mode control method, so as to solve the technical problems of inaccurate driving mode control and inconvenient operation existing in the prior art.

A second purpose of this disclosure is to provide a driving mode control apparatus.

A third purpose of this disclosure is to provide a computing processing device.

A fourth purpose of this disclosure is to provide a computer program.

A fifth purpose of this disclosure is to provide a computer readable storage medium.

To achieve the above purposes, an embodiment of a first aspect of this disclosure provides a driving mode control method for a control platform, the method comprising:
  acquiring a location information sent by a target vehicle, wherein the location information comprises a target location;
  determining a status data of at least one sample vehicle pre-stored by the control platform based on the target location, wherein the sample vehicle is a vehicle which has travelled through the target location;
  determining a target driving mode based on the status data of the sample vehicle, and sending the target driving mode to the target vehicle, such that the target vehicle travels in the target driving mode.

According to one embodiment of this disclosure, determining the status data of the at least one sample vehicle pre-stored by the control platform based on the target location comprises:
  determining a target road segment involving the target location;
  determining the sample vehicle which has travelled through the target road segment during a preset time period before a current time point;
  acquiring the status data of the sample vehicle, wherein the status data comprises a driving mode, a power consumption or a fuel consumption of the sample vehicle when the sample vehicle is travelling through the target road segment.

According to one embodiment of this disclosure, the driving mode is one of a plurality of driving modes and the sample vehicle is one of a plurality of sample vehicles, and determining the target driving mode based on the status data of the sample vehicle comprises:
  determining an average power consumption and an average fuel consumption corresponding to each one of the driving modes based on the status data of the plurality of sample vehicles;
  determining an energy consumption corresponding to each one of the driving modes based on the average power consumption and the average fuel consumption corresponding to the each one of the driving modes;
  determining the target driving mode based on the energy consumption corresponding to the each one of the driving modes.

According to one embodiment of this disclosure, determining the average power consumption and the average fuel consumption corresponding to the each one of the driving modes based on the status data of the plurality of sample vehicles comprises:
  for each one of the sample vehicles, determining the power consumption and the fuel consumption of the sample vehicle travelling in each one of the driving modes based on the status data of the sample vehicle;
  determining a corresponding first weighting coefficient and a corresponding second weighting coefficient of the sample vehicle based on a travel time when the sample vehicle travelled through the target road segment;
  determining the average power consumption corresponding to a first driving mode based on the power consumption of each one of the sample vehicles travelling in a first driving mode and the corresponding first weighting coefficient of the each one of the sample vehicles, wherein the first driving mode is any one of the driving modes; determining the average fuel consumption corresponding to the first driving mode based on the fuel consumption of each one of the sample vehicles travelling in the first driving mode and the corresponding second weighting coefficient of the each one of the sample vehicles.

According to one embodiment of this disclosure, determining the energy consumption corresponding to each one of the driving modes based on the average power consumption and the average fuel consumption corresponding to the each one of the driving modes comprises:
  determining a power consumption time and a fuel consumption time of each one of the sample vehicles;

determining a third weighting coefficient and a fourth weighting coefficient based on the power consumption time and the fuel consumption time of the each one of the sample vehicles;

taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

According to one embodiment of this disclosure, the method further comprises acquiring a status data sent by the target vehicle and storing the status data of the target vehicle.

According to one embodiment of this disclosure, prior to storing the status data of the target vehicle, the method further comprises:
  determining whether the status data of the target vehicle is valid based on a preset power threshold and a preset fuel threshold;
  determining that the status data of the target vehicle is valid if the power consumption comprised in the status data of the target vehicle is less than or equal to the power threshold and the fuel consumption comprised in the status data of the target vehicle is less than or equal to the fuel threshold;
  storing the status data of the target vehicle, which comprises:
  storing the status data of the target vehicle if the status data of the target vehicle is valid.

The first aspect of this disclose provides a driving mode control method, in which the control platform firstly acquires the location information sent by the target vehicle, wherein the location information comprises a target location; then determines the status data of at least one sample vehicle pre-stored by the control platform based on the target location, wherein the sample vehicle is a vehicle which has travelled through the target location; and finally determines the target driving mode based on the status data of the sample vehicle and sends the target driving mode to the target vehicle such that the target vehicle travels in the target driving mode. By determining a corresponding sample vehicle based on the location information of the target vehicle, and then determining a suitable target driving mode for the target vehicle to currently travel in based on the status data of the sample vehicle, this disclosure enables the target vehicle to travel in the target driving mode. The driver needs not to manually switch the driving mode, and the accuracy and convenience of controlling the drive mode are improved.

To achieve the above purposes, an embodiment of a second aspect of this disclosure provides a driving mode control apparatus for a control platform, the apparatus comprising:
  an acquiring module, used for acquiring a location information sent by a target vehicle, wherein the location information comprises a target location;
  a determining module, used for determining a status data of at least one sample vehicle pre-stored by the control platform based on the target location, wherein the sample vehicle is a vehicle which has travelled through the target location;
  a controlling module, used for determining a target driving mode based on the status data of the sample vehicle, and sending the target driving mode to the target vehicle, such that the target vehicle travels in the target driving mode.

According to one embodiment of this disclosure, the determining module comprises:
  a first determining sub-module, used for determining a target road segment involving the target location;
  a second determining sub-module, used for determining the sample vehicle which has travelled through the target road segment during a preset time period before a current time point;
  an acquiring sub-module, used for acquiring the status data of the sample vehicle, wherein the status data comprises a driving mode, a power consumption or a fuel consumption of the sample vehicle when the sample vehicle is travelling through the target road segment.

According to one embodiment of this disclosure, the driving mode is one of a plurality of driving modes and the sample vehicle is one of a plurality of sample vehicles, and the controlling module is used for:
  determining an average power consumption and an average fuel consumption corresponding to each one of the driving modes based on the status data of the plurality of sample vehicles;
  determining an energy consumption corresponding to each one of the driving modes based on the average power consumption and the average fuel consumption corresponding to the each one of the driving modes;
  determining the target driving mode based on the energy consumption corresponding to the each one of the driving modes.

According to one embodiment of this disclosure, the controlling module is used for:
  for each one of the sample vehicles, determining the power consumption and the fuel consumption of the sample vehicle travelling in each one of the driving modes based on the status data of the sample vehicle;
  determining a corresponding first weighting coefficient and a corresponding second weighting coefficient of the sample vehicle based on a travel time when the sample vehicle travelled through the target road segment;
  determining the average power consumption corresponding to a first driving mode based on the power consumption of each one of the sample vehicles travelling in a first driving mode and the corresponding first weighting coefficient of the each one of the sample vehicles, wherein the first driving mode is any one of the driving modes;
  determining the average fuel consumption corresponding to the first driving mode based on the fuel consumption of each one of the sample vehicles travelling in the first driving mode and the corresponding second weighting coefficient of the each one of the sample vehicles.

According to one embodiment of this disclosure, the controlling module is used for:
  determining a power consumption time and a fuel consumption time of each one of the sample vehicles;
  determining a third weighting coefficient and a fourth weighting coefficient based on the power consumption time and the fuel consumption time of the each one of the sample vehicles;
  taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

According to one embodiment of this disclosure, the apparatus further comprises:
- a storing module, used for acquiring a status data sent by the target vehicle and storing the status data of the target vehicle.

According to one embodiment of this disclosure, the apparatus further comprises:
- a judging module, used for determining whether the status data of the target vehicle is valid based on a preset power threshold and a preset fuel threshold, prior to storing the status data of the target vehicle;
- the judging module is also used for determining that the status data of the target vehicle is valid if the power consumption comprised in the status data of the target vehicle is less than or equal to the power threshold and the fuel consumption comprised in the status data of the target vehicle is less than or equal to the fuel threshold;
- the storing module is used for storing the status data of the target vehicle if the status data of the target vehicle is valid.

The second aspect of this disclose provides a driving mode control apparatus, the control platform firstly acquires the location information sent by the target vehicle, wherein the location information comprises a target location; then determines the status data of at least one sample vehicle pre-stored by the control platform based on the target location, wherein the sample vehicle is a vehicle which has travelled through the target location; and finally determines the target driving mode based on the status data of the sample vehicle and sends the target driving mode to the target vehicle such that the target vehicle travels in the target driving mode. By determining a corresponding sample vehicle based on the location information of the target vehicle, and then determining a suitable target driving mode for the target vehicle to currently travel in based on the status data of the sample vehicle, this disclosure enables the target vehicle to travel in the target driving mode. The driver needs not to manually switch the driving mode, and the accuracy and convenience of controlling the drive mode are improved.

To achieve the above purposes, an embodiment of a third aspect of this disclosure provides a computing processing device, which comprises:
- a memory, in which a computer readable code is stored; and
- one or more processors, wherein when the computer readable code is executed by the one or more processors, the computing processing device implements the driving mode control method provided in the embodiment of the first aspect of this disclosure.

To achieve the above purposes, an embodiment of a fourth aspect of this disclosure provides a computer program, comprising a computer readable code, which, when the computer readable code runs on a computing processing device, causes a computing processing device to implement the driving mode control method provided in the embodiment of the first aspect of this disclosure.

To achieve the above purposes, an embodiment of a fifth aspect of this disclosure provides a computer readable storage medium, in which the computer program provided in the embodiment of the fourth aspect of this disclosure is stored.

The above and/or additional aspects and advantages of this disclosure will be presented in the following description, and part of them will become apparent from the following description or be understood from the practice of this disclosure.

BRIEF DESCRIPTION OF THE DRAWINGS

The above and/or additional aspects and advantages of this disclosure will become apparent and easy to understand from the following description of embodiments taken in conjunction with the accompanying drawings, in which.

DETAILED DESCRIPTION OF THE EMBODIMENTS

Figure 1:
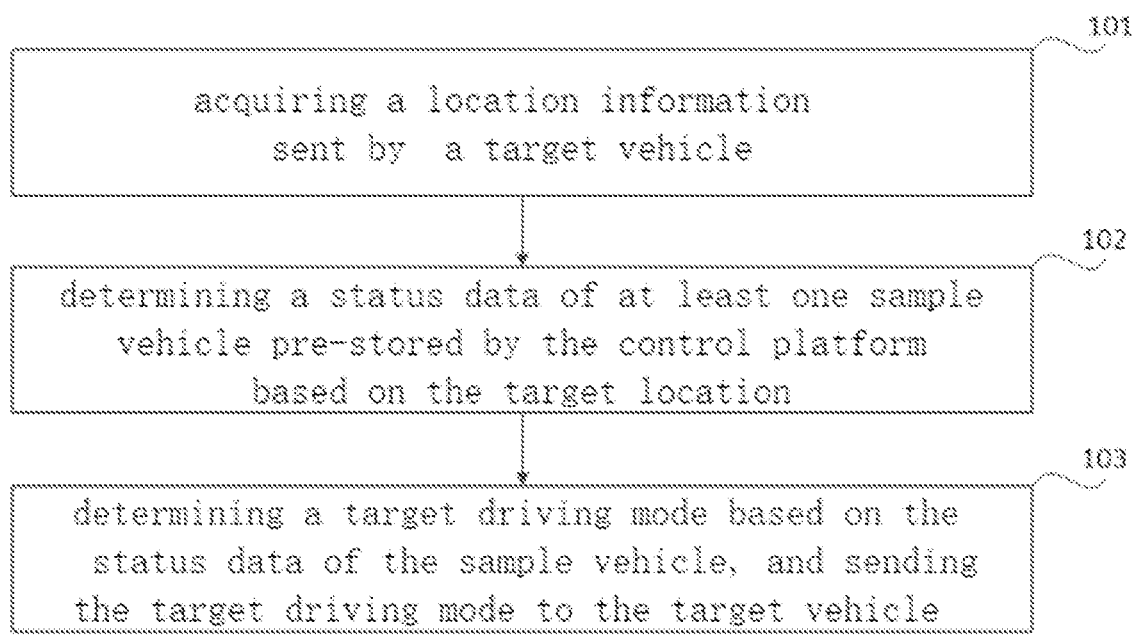
FIG. 1 is the flow chart of one driving mode control method shown in accordance with one exemplary embodiment.

The embodiments of this disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the exemplary embodiment and should not be regarded as any limitations thereto.

Below the driving mode control method, apparatus, device, program and storage medium of the embodiments of this disclosure are described with reference to the accompanying drawings.

Before introducing the driving mode control method, apparatus, device, program and storage medium provided in this disclosure, an application scenario involved in various embodiments of this disclosure is introduced. The application scenario may comprise a control platform and a vehicle, and the control platform and the vehicle can communicate via any protocol of Wireless Local Area Networks (WLAN), Telematics, Vehicle to Everything (V2X), $4^{th}$ Generation mobile communication technology (4G) or $5^{th}$ Generation mobile communication technology (5G), to transmit data.

Wherein the control platform can be provided on a server, or on a terminal device, which is not specifically limited in this disclosure. The server may include, but is not limited to, an entity server, a server cluster, or a cloud server. The terminal device may be, for example, a tablet computer, a smart TV, a Personal Digital Assistant (PDA), a mobile terminal such as a portable computer, or a fixed terminal such as a desktop computer. The vehicle may be an automobile, but is not limited to a traditional automobile, a pure electric automobile or a hybrid automobile, and in addition, the driving mode control method and apparatus provided in this disclosure may also be applied to other types of motor vehicles or non-motor vehicles.

FIG. 1 is the flow chart of one driving mode control method shown in accordance with one exemplary embodiment. As shown in FIG. 1, the method is for a control platform, and comprises the following steps:

Step 101: acquiring a location information sent by a target vehicle, wherein the location information comprises a target location.

For example, after the vehicle is started, the location information of the vehicle may be acquired by a radar (such as a millimeter wave radar, a microwave radar), a GPS (Global Positioning System), a BDS (BeiDou Navigation Satellite System) and the like provided on the vehicle, wherein the location information may include a target location, and may further include other information such as the current time. The target location may include the street or the national highway where the vehicle (i.e., the target vehicle) is located, and may further include the latitude and longitude where the target vehicle is located, etc., which is not specifically limited in this disclosure. After the acquisition of the location information, the location information may be sent to the control platform through the controller of the target vehicle, the control platform may acquire the location information. The controller may be an MCU (Microcontroller Unit), ECU (Electronic Control Unit), or BCM (Body Control Module), among others. The target vehicle may be provided with only one controller to implement all of the control logics of the target vehicle, and may also be provided with a plurality of controllers to respectively implement different control logics of the target vehicle. For example, the target vehicle may be provided with a light controller for controlling the lights, a rescue controller for assisting in safety rescue, and the like. The target vehicle may also send the VIN of the target vehicle to the control platform while sending the location information to the control platform. VIN (Vehicle Identification Number) is a 17-digit code of letters and numbers that meets standard for example GB 16735. The VIN of each target vehicle is unique, that is, one VIN can only identify one target vehicle. In this way, when a plurality of target vehicles are sending their location information to the control platform, the control platform can identify the received plurality of location information according to the VINs of the target vehicles, so as to determine the target vehicle corresponding to each location information.

Further, before sending the location information and the VIN, the controller may firstly acquire the network connection state of the communication network between the target vehicle and the control platform. If the network connection state is normal, the location information and the VIN of the target vehicle may be directly sent to the control platform. If the network connection state is abnormal, the location information may be stored first, then the network connection state is continuously acquired, and the location information and the VIN of the target vehicle will be sent to the control platform once the network connection state is normal, so that the control platform acquires the location information corresponding to each target vehicle.

Step 102: determining a status data of at least one sample vehicle pre-stored by the control platform based on the target location, wherein the sample vehicle is a vehicle which has travelled through the target location.

Step 103: determining a target driving mode based on the status data of the sample vehicle, and sending the target driving mode to the target vehicle such that the target vehicle travels in the target driving mode.

For example, after acquiring the location information, the control platform may determine the status data of the at least one sample vehicle from the pre-stored status data of large numbers of vehicles, based on the target location in the location information. That is, the control platform has received the status data uploaded by the large numbers of vehicles in advance and stored these status data. After receiving the location information, the control platform may sift the status data of the large numbers of vehicles based on the target location therein, so as to obtain the status data of the at least one sample vehicle suitable for the target vehicle. Wherein, the sample vehicle is the vehicle which has travelled through the target location. The status data may include the driving mode, the power consumption, the fuel consumption of the sample vehicle when the sample vehicle is travelling through a target road segment, and may further include the time when the sample vehicle is travelling through the target road segment, and etc. The driving mode may include, for example, AUTO mode, EV mode, Sport mode, Save mode, AWD (All-Wheel Drive) mode. For example, during travelling the vehicle can send the location information and the status data of the vehicle to the control platform, and the control platform may store the location information and the status data of the vehicle. Then, after determining the target location, the control platform can sift the status data of the large numbers of vehicles stored in the preset database based on the target location, to find one or more sample vehicles having travelled through the target location, so as to obtain the status data of each sample vehicle. In another implementation, after the status data of the one or more sample vehicles are obtained, the status data of the sample vehicles may be sifted based on the time when the sample vehicle has travelled through the target location and on a specified time period (for example, a time period from current time to 3 days before the current time). If the time when the sample vehicle has travelled through the target location is in the specified time period, the status data of the sample vehicle may be reserved. If the time when the sample vehicle has travelled through the target location is not in the specified time period, the status data of the sample vehicle may be ignored, or the status data of the sample vehicle may be deleted, which is not limited in this disclosure.

After obtaining the status data of the sample vehicle, the control platform may determine the target driving mode based on the status data of each sample vehicle according to a preset rule. The preset rule may be, for example, a pre-established function relation or model, etc. The target driving mode may be one or more (for example, two). For example, it is possible to determine the most economical driving mode based on the status data of each sample vehicle, and then determine the most economical driving mode as the target driving mode. It is also possible to determine two most economical driving modes based on the status data of each sample vehicle, and then determine the two most economical driving modes as the target driving modes. In another implementation, it is possible to determine the most used driving mode based on the status data of the sample vehicles, and then determine the most used driving mode as the target driving mode. While determining the target driving mode, the control platform may send the target driving mode to the target vehicle according to the VIN of the target vehicle, and the target vehicle may receive the target driving mode. In a scenario where one target driving mode is determined, after the target vehicle receives the target driving mode, the controller may directly control the target vehicle according to the target driving mode, so that the target vehicle travels in the target driving mode. The controller may also generate a corresponding prompt information according to the target driving mode, for example, generate a prompt information in a voice form, to prompt the driver of the target vehicle to switch the current driving mode to the target driving mode. In a scenario where more than one target driving modes are determined, after the target vehicle receives the target driving modes, the controller may generate a corresponding prompt information according to the target driving modes, so that the driver of the target vehicle can select a suitable target driving mode for the target vehicle from among the target driving modes, and the target vehicle travels in the target driving mode selected by the driver.

To sum up, in this disclosure, the control platform firstly acquires the location information sent by the target vehicle, wherein the location information comprises a target location; then determines the status data of at least one sample vehicle pre-stored by the control platform based on the target location, wherein the sample vehicle is a vehicle which has travelled through the target location; and finally determines the target driving mode based on the status data of the sample vehicle and sends the target driving mode to the target vehicle such that the target vehicle travels in the target driving mode. By determining a corresponding sample vehicle based on the location information of the target vehicle and then determining a suitable target driving mode for the target vehicle to currently travel in based on the status data of the sample vehicle, this disclosure enables the target vehicle to travel in the target driving mode. The driver needs not to manually switch the driving mode, and the accuracy and convenience of controlling the drive mode are improved.

Figure 2:
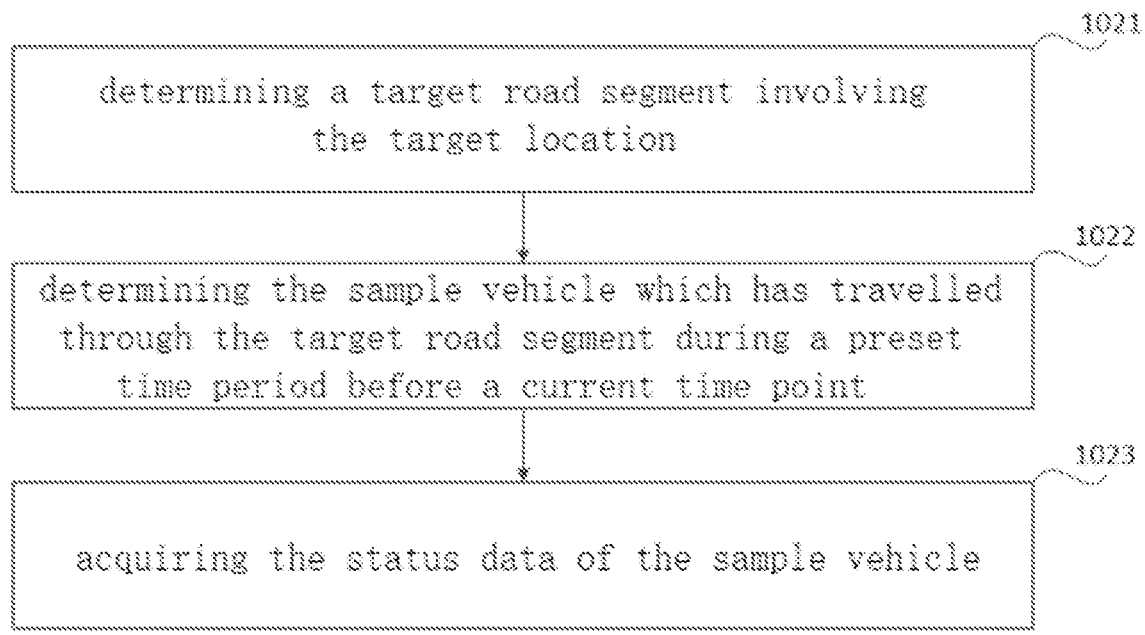
FIG. 2 is the flow chart of another driving mode control method shown in accordance with one exemplary embodiment.

FIG. 2 is the flow chart of another driving mode control method shown in accordance with one exemplary embodiment. As shown in FIG. 2, Step 102 comprises:

Step 1021: determining a target road segment involving the target location.

Step 1022: determining the sample vehicle which has travelled through the target road segment during a preset time period before a current time point.

Step 1023: acquiring the status data of the sample vehicle, wherein the status data comprises the driving mode, the power consumption or the fuel consumption of the sample vehicle when the sample vehicle is travelling through the target road segment.

For example, after the target location is determined, the target vehicle involved target road segment may be determined based on the target location, and then a preset duration (for example, 48 h) before the current time point may be determined. After the target road segment and the preset duration before the current time point is determined, the status data of the vehicles pre-stored by the control platform may be sifted for the status data of the sample vehicles having travelled through the target road segment within the preset duration before the current time point. The status data may include the driving mode, the power consumption, the fuel consumption and the like of the sample vehicle when it is travelling through the target road segment.

For example, the location information of the travelling vehicle and the travel time when the vehicle is travelling through each location may be stored in the preset database of the control platform, and then the control platform may first sift the large amount of status data in the preset database according to the target road segment after determining the target road segment, to find one or more sample vehicles having travelled through the target road segment, so as to obtain the status data of each sample vehicle. Then, the travel time of each sample vehicle when it has travelled through the target road segment may be sifted according to the preset duration before the current time point. If the travel time of the sample vehicle when it has travelled through the target road segment is in the preset duration before the current time point, it is indicated that the road condition of the target road segment at the current time point is close to the road condition when the sample vehicle has travelled through the target road segment, so that the reference value of the status data of the sample vehicle is relatively high, and the status data of the sample vehicle can be reserved. If the travel time of the sample vehicle when it has travelled through the target road segment is not in the preset duration before the current time point, it is indicated that the road condition of the target road segment at the current time point may have changed, and is different from the road condition when the sample vehicle has travelled through the target road segment, so that the reference value of the status data of the sample vehicle is relatively low, and the status data of the sample vehicle can be ignored, or the status data of the sample vehicle can be deleted, which is not limited in this disclosure.

Figure 3:
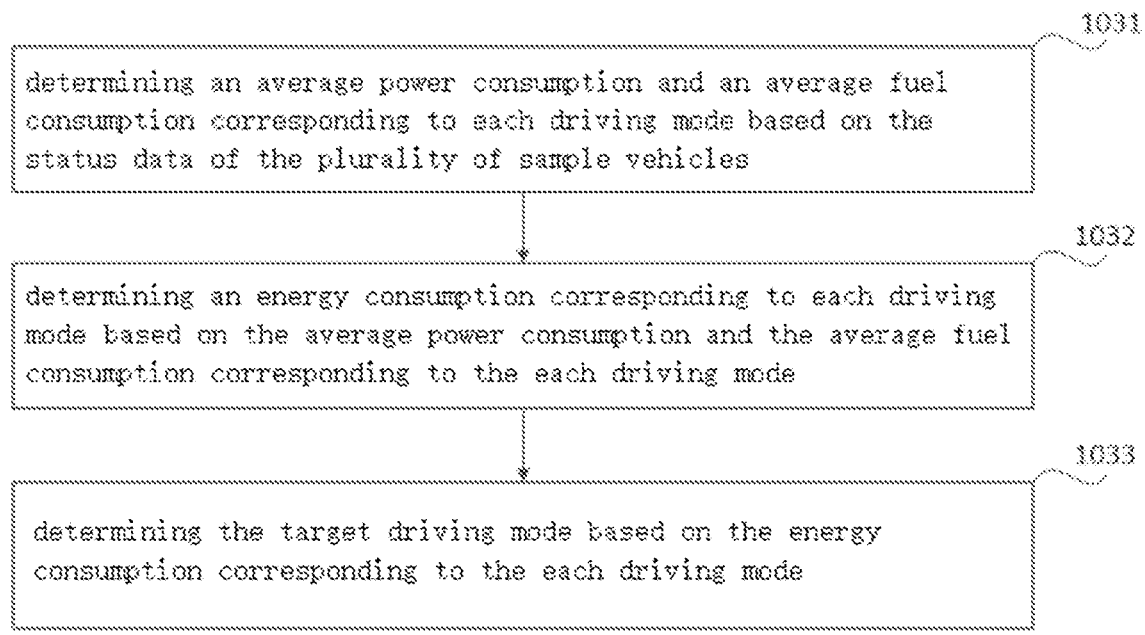
FIG. 3 is the flow chart of another driving mode control method shown in accordance with one exemplary embodiment.

FIG. 3 is the flow chart of another driving mode control method shown in accordance with one exemplary embodiment. As shown in FIG. 3, the driving mode is one of a plurality of driving modes and the sample vehicle is one of a plurality of sample vehicles, and Step 103 comprises:

Step 1031: determining an average power consumption and an average fuel consumption corresponding to each one of the driving modes based on the status data of the plurality of sample vehicles.

Step 1032: determining an energy consumption corresponding to each one of the driving modes based on the average power consumption and the average fuel consumption corresponding to the each one of the driving modes.

Step 1033: determining the target driving mode based on the energy consumption corresponding to the each one of the driving modes.

For example, during the determination of the target driving mode, it is possible to determine the average power consumption and the average fuel consumption corresponding to each driving mode based on the status data of the plurality of sample vehicles. For example, the average power consumption and the average fuel consumption corresponding to each driving mode may be determined based on the maximum power consumption and the maximum fuel consumption of each sample vehicle. The average power consumption and the average fuel consumption corresponding to each driving mode may also be determined based on the average power consumption and the average fuel consumption of each sample vehicle when it travels through the target road segment. Then, the energy consumption corresponding to each driving mode may be determined based on the average power consumption and the average fuel consumption corresponding to each driving mode. Then, the target driving mode may be determined based on the energy consumption corresponding to each driving mode. For example, the driving mode with the lowest energy consumption may be determined as the target driving mode, and in another implementation, a preset number (for example, 3) of driving modes with the lowest energy consumption may be determined as the target driving modes, which is not specifically limited in this disclosure.

Optionally, the implementation of Step 1031 may comprise:

Firstly, for each one of the sample vehicles, determining the power consumption and the fuel consumption of the sample vehicle travelling in each one of the driving modes based on the status data of the sample vehicle.

Then, determining a corresponding first weighting coefficient and a corresponding second weighting coefficient of the sample vehicle based on a travel time when the sample vehicle travelled through the target road segment.

Then, determining the average power consumption corresponding to a first driving mode based on the power consumption of each one of the sample vehicles travelling in the first driving mode and the corresponding first weighting coefficient of the each one of the sample vehicles, wherein the first driving mode is any one of the driving modes.

Finally, determining the average fuel consumption corresponding to the first driving mode based on the fuel consumption of each one of the sample vehicles travelling in the first driving mode and the corresponding second weighting coefficient of the each one of the sample vehicles.

For example, during the determination of the average power consumption and the average fuel consumption corresponding to each driving mode, it is possible to determine for each sample vehicle the power consumption and the fuel consumption of the sample vehicle travelling in each driving mode, based on the status data of the sample vehicle. Then, the corresponding first weighting coefficient and the corresponding second weighting coefficient of the sample vehicle may be determined based on the travel time of the sample vehicle spent when it traveled through the target road segment. The second weighting coefficient may be the same as the first weighting coefficient, or may be different from the first weighting coefficient. There may be a plurality first weighting coefficients, and each first weighting coefficient corresponds to the power consumption of each sample vehicle travelling in each driving mode. There may be a plurality of second weighting coefficients, and each second weighting coefficient corresponds to the fuel consumption of each sample vehicle travelling in each driving mode. During the determination of the first weighting coefficient and the second weighting coefficient, it is possible to determine the first weighting coefficient and the second weighting coefficient corresponding to each driving mode by querying a preset relational table. In the preset relational table, the closer the travel time of the sample vehicle when it traveled through the target road segment in a certain driving mode to the current time, the greater the first weighting coefficient (or the second weighting coefficient); the farther the travel time of the sample vehicle when it traveled through the target road segment from the current time, the smaller the first weighting coefficient (or the second weighting coefficient). This may mean that the first weighting coefficient (or the second weighting coefficient) is inversely proportional to the difference between the current time and the travel time when the sample vehicle travelled through the target road segment (current time—the travel time when the sample vehicle travelled through the target road segment). The sum of the determined first weighting coefficients is 1 and the sum of the determined second weighting coefficients is 1. Then it is possible to determine the average power consumption corresponding to the first driving mode based on the power consumption of each sample vehicle travelling in the first driving mode and the corresponding first weighting coefficient of each sample vehicle, wherein the first driving mode is any one of the driving modes.

For example, when S sample vehicles respectively travel in five driving modes A, B, C, D, and E, the average power consumption corresponding to each driving mode may be expressed as:

$$Q_{A_{Avg}} = K_1 \times Q_{A_1} + K_2 \times Q_{A_2} + \ldots + K_S \times Q_{A_S}$$

$$Q_{B_{Avg}} = K_1 \times Q_{B_1} + K_2 \times Q_{B_2} + \ldots + K_S \times Q_{B_S}$$

$$Q_{C_{Avg}} = K_1 \times Q_{C_1} + K_2 \times Q_{C_2} + \ldots + K_S \times Q_{C_S}$$

$$Q_{D_{Avg}} = K_1 \times Q_{D_1} + K_2 \times Q_{D_2} + \ldots + K_S \times Q_{D_S}$$

$$Q_{E_{Avg}} = K_1 \times Q_{E_1} + K_2 \times Q_{E_2} + \ldots + K_S \times Q_{E_S}$$

Wherein, $K_1$ represents the corresponding first weighting coefficient of the first sample vehicle travelling in each driving mode, $K_2$ represents the corresponding first weighting coefficient of the second sample vehicle in each driving mode, $K_S$ represents the corresponding first weighting coefficient of the Sth sample vehicle in each driving mode, and $K_1 + K_2 + \ldots + K_S = 1$. If the S sample vehicles are arranged in a descending order of the temporal proximity of the travel time when the vehicles travelled through the target road segment, that is, if the travel time of the first sample vehicle when it traveled through the target road segment is closest to the current time, and the travel time of the second sample vehicle is second closest, and so on, then $K_1 > K_2 > \ldots > K_S$. $Q_{A_1}$ represents the power consumption of the first sample vehicle travelling in the driving mode A, $Q_{A_2}$ represents the power consumption of the second sample vehicle in the driving mode A, $Q_{A_S}$ represents the power consumption of the Sth sample vehicle in the driving mode A, and Avg represents the average power consumption corresponding to the driving mode A. Likewise, $Q_{B_1}$, $Q_{C_1}$, $Q_{D_1}$, $Q_{E1}$ respectively represent the power consumption of the first sample vehicle travelling in the driving modes B, C, D, and E, $Q_{B_2}$, $Q_{C_2}$, $Q_{D_2}$, $Q_{E_2}$ respectively represent the power consumption of the second sample vehicle in the driving modes B, C, D, and E, and $Q_{B_S}$, $Q_{C_S}$, $Q_{D_S}$, $Q_{E_S}$ respectively represent the power consumption of the Sth sample vehicle in the driving modes B, C, D and E. $Q_{B_{Avg}}$, $Q_{C_{Avg}}$, $Q_{D_{Avg}}$, $Q_{E_{Avg}}$ respectively represent the average power consumption corresponding to the driving modes B, C, D, and E.

Similarly, the average fuel consumption corresponding to the first driving mode may be determined based on the fuel consumption of each sample vehicle travelling in the first driving mode and the corresponding second weighting coefficient of each sample vehicle. When the S sample vehicles respectively travel in the five driving modes A, B, C, D and E, the average fuel consumption corresponding to each driving mode may be expressed as:

$$L_{A_{Avg}} = F_1 \times L_{A_1} + F_2 \times L_{A_2} + \ldots + F_S \times L_{A_S}$$

$$L_{B_{Avg}} = F_1 \times L_{B_1} + F_2 \times L_{B_2} + \ldots + F_S \times L_{B_S}$$

$$L_{C_{Avg}} = F_1 \times L_{C_1} + F_2 \times L_{C_2} + \ldots + F_S \times L_{C_S}$$

$$L_{D_{Avg}} = F_1 \times L_{D_1} + F_2 \times L_{D_2} + \ldots + F_S \times L_{D_S}$$

$$L_{E_{Avg}} = F_1 \times L_{E_1} + F_2 \times L_{E_2} + \ldots + F_S \times L_{E_S}$$

Wherein, $F_1$ represents the corresponding second weighting coefficient of the first sample vehicle travelling in each driving mode, $F_2$ represents the corresponding second weighting coefficient of the second sample vehicle in each driving mode, $F_S$ represents the corresponding second weighting coefficient of the Sth sample vehicle in each driving mode, and $F_1+F_2+\ldots+F_S=1$. If the S sample vehicles are arranged in a descending order of the temporal proximity of the travel time when the vehicles travelled through the target road segment, that is, if the travel time of the first sample vehicle when it traveled through the target road segment is closest to the current time, and the travel time of the second sample vehicle is second closest, and so on, then, $F_1>F_2>\ldots>F_S$. $L_{A_1}$ represents the fuel consumption of the first sample vehicle travelling in the driving mode A, $L_{A_2}$ represents the fuel consumption of the second sample vehicle in the driving mode A, $L_{A_S}$ represents the fuel consumption of the Sth sample vehicle in the driving mode A, and $L_{A_{Avg}}$ represents the average fuel consumption corresponding to the driving mode A. Likewise, $L_{B_1}$, $L_{C_1}$, $L_{D_1}$, $L_{E_1}$, respectively represent the fuel consumption of the first sample vehicle travelling in the driving modes B, C, D and E, $L_{B_2}$, $L_{C_2}$, $L_{D_2}$, $L_{E_2}$ respectively represent the fuel consumption of the second sample vehicle in the driving modes B, C, D and E, and $L_{B_S}$, $L_{C_S}$, $L_{D_S}$, $L_{E_S}$ respectively represent the fuel consumption of the Sth sample vehicle in the driving mode B, C, D and E. $L_{B_{Avg}}$, $L_{C_{Avg}}$, $L_{D_{Avg}}$, $L_{E_{Avg}}$ respectively represent the average fuel consumption corresponding to the driving modes B, C, D, and E.

Specifically, determining the energy consumption corresponding to each one of the driving modes based on the average power consumption and the average fuel consumption corresponding to the each one of the driving modes comprises:

Step (1): determining the power consumption time and the fuel consumption time of each one of the sample vehicles.

Step (2): determining a third weighting coefficient and a fourth weighting coefficient based on the power consumption time and the fuel consumption time of the each one of the sample vehicles.

Step (3): taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

In one implementation, after the determination of the average power consumption and the average fuel consumption corresponding to each driving mode, it is possible to go on to determine the power consumption time and the fuel consumption time of each sample vehicle, and then to determine the third weighting coefficient (e.g., M1) and the fourth weighting coefficient (e.g., M2) based on the power consumption time and the fuel consumption time of each sample vehicle. The third weighting coefficient may be, for example, the ratio of the power consumption time of all the sample vehicles to the sum of the power consumption time and the fuel consumption time of all the sample vehicles, and the fourth weighting coefficient may be, for example, the ratio of the fuel consumption time of all the sample vehicles to the sum of the power consumption time and the fuel consumption time of all the sample vehicles. After the determination of the third weighting coefficient and the fourth weighting coefficient, it is possible to take the sum of the product of the average power consumption corresponding to each driving mode and the third weighting coefficient and the product of the average fuel consumption corresponding to each driving mode and the fourth weighting coefficient as the energy consumption corresponding to each driving mode.

When S sample vehicles respectively travel in the five driving modes A, B, C, D, and E, the energy consumption corresponding to each driving mode may be expressed as:

$$C_A = M_1 \times Q_{A_{Avg}} + M_2 \times L_{A_{Avg}}$$

$$C_B = M_1 \times Q_{B_{Avg}} + M_2 \times L_{B_{Avg}}$$

$$C_C = M_1 \times Q_{C_{Avg}} + M_2 \times L_{C_{Avg}}$$

$$C_D = M_1 \times Q_{D_{Avg}} + M_2 \times L_{D_{Avg}}$$

$$C_E = M_1 \times Q_{E_{Avg}} + M_2 \times L_{E_{Avg}}$$

Figure 4:
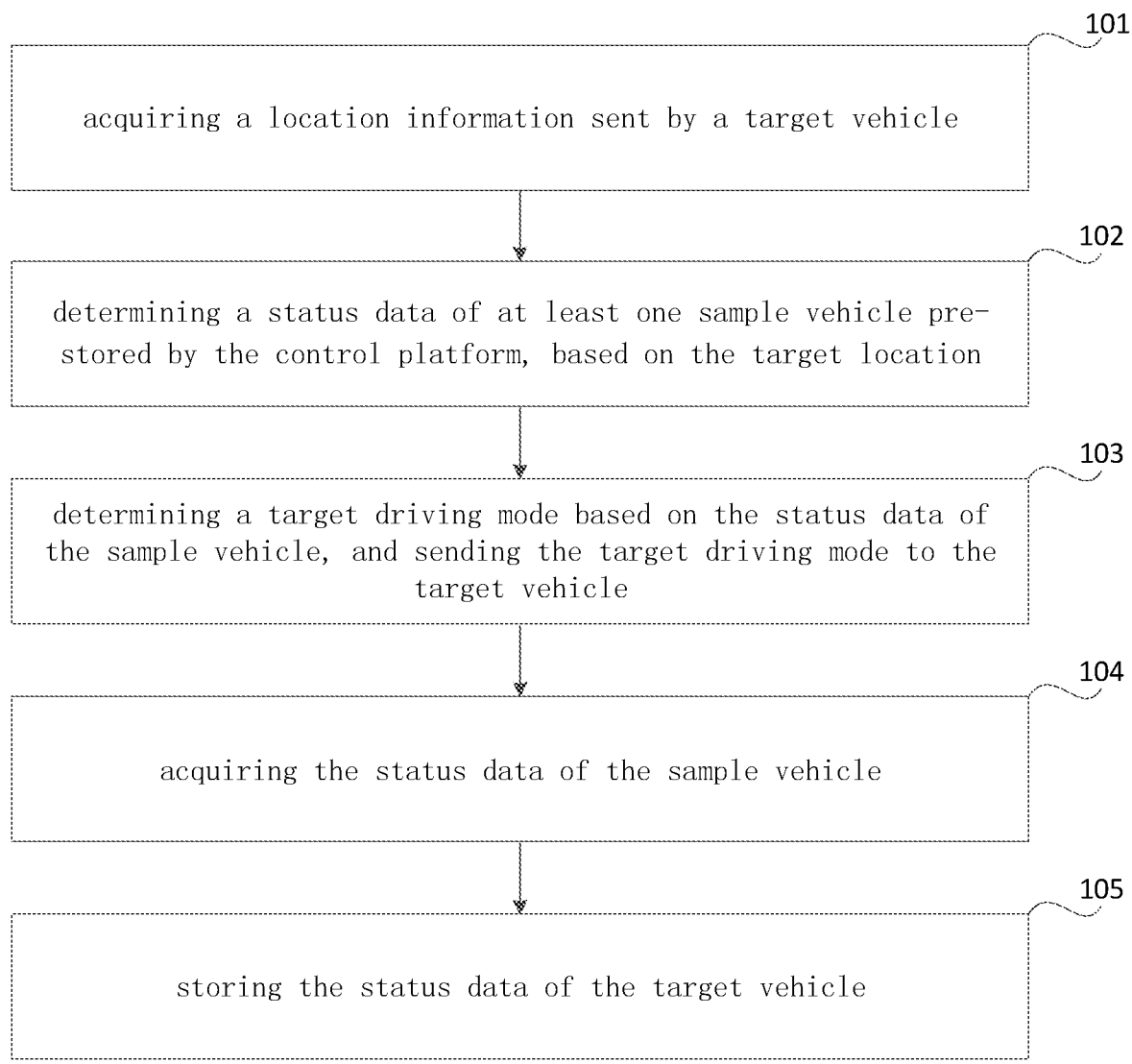
FIG. 4 is the flow chart of another driving mode control method shown in accordance with one exemplary embodiment.

Wherein, $C_A$, $C_B$, $C_C$, $C_D$, $C_E$ respectively represent the energy consumption corresponding to the driving modes A, B, C, D, and E, and $M_1+M_2=1$ FIG. 4 is the flow chart of another driving mode control method shown in accordance with one exemplary embodiment. As shown in FIG. 4, the method further comprises:

Step 104: acquiring the status data sent by the target vehicle.

Step 105: storing the status data of the target vehicle.

For example, the control platform may further acquire the status data sent by the target vehicle, and store the status data of the target vehicle into the preset database. For example, after acquiring the status data of the target vehicle, the control platform may store the status data of the target vehicle in the preset database according to the VIN of the target vehicle, so that the control platform can determine the driving modes of other vehicles based on the status data.

Figure 5:
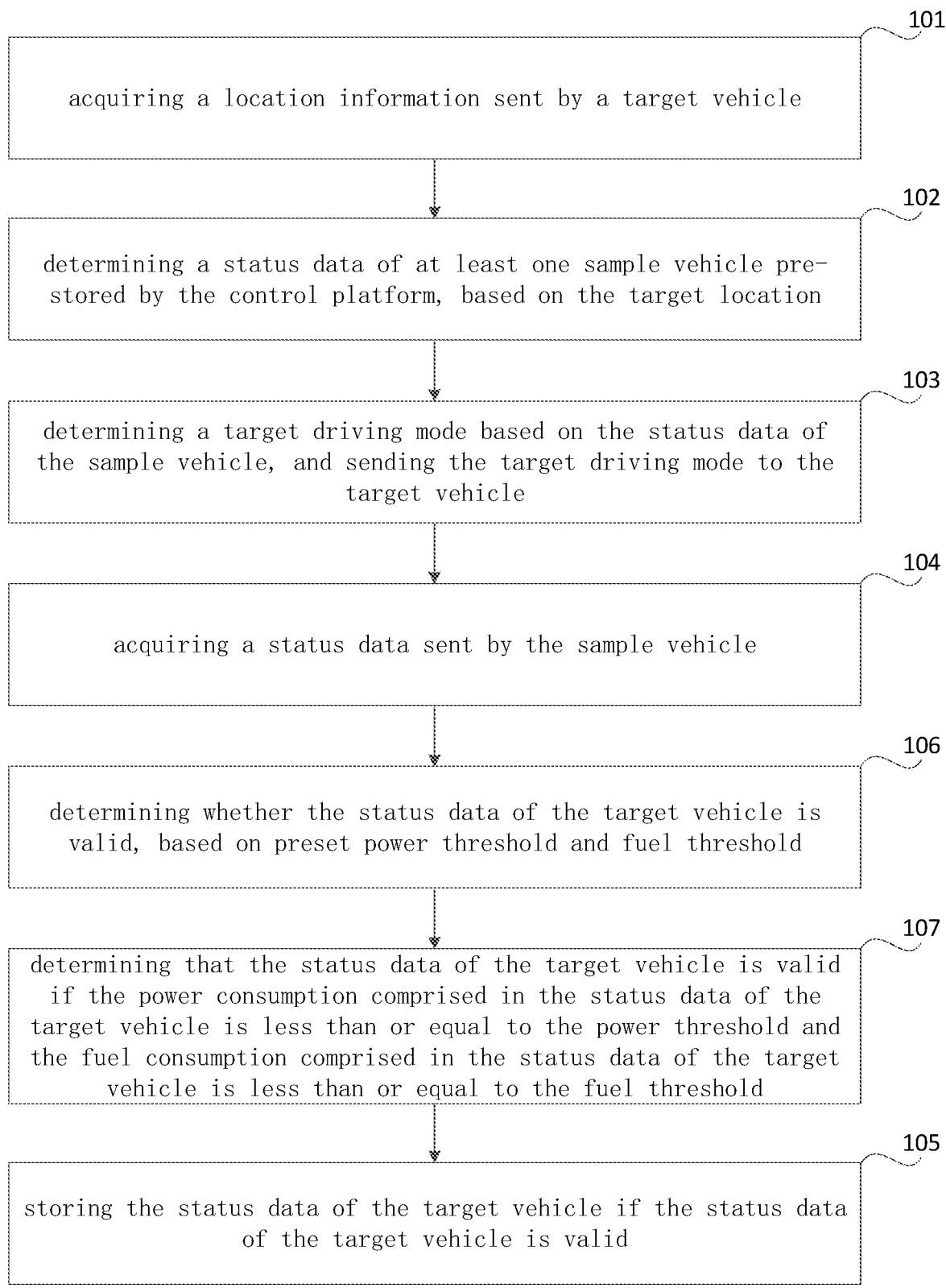
FIG. 5 is the flow chart of another driving mode control method shown in accordance with one exemplary embodiment.

FIG. 5 is the flow chart of another driving mode control method shown in accordance with one exemplary embodiment. As shown in FIG. 5, the method further comprises:

Step 106: determining whether the status data of the target vehicle is valid based on a preset power threshold and a preset fuel threshold.

Step 107: determining that the status data of the target vehicle is valid if the power consumption comprised in the status data of the target vehicle is less than or equal to the power threshold and the fuel consumption comprised in the status data of the target vehicle is less than or equal to the fuel threshold.

Step 105 comprises:

storing the status data of the target vehicle if the status data of the target vehicle is valid.

For example, after the acquisition the status data of the target vehicle, it is possible to make a judgement on the power consumption and the fuel consumption comprised in the status data of the target vehicle based on the preset power threshold and the preset fuel threshold, so as to determine whether the status data of the target vehicle is valid. The preset power threshold may be, for example, 20 kilowatt-hours per hundred kilometers, and the preset fuel threshold may be, for example, 10 liters per hundred kilometers. If the power consumption comprised in the status data of the target vehicle is less than or equal to the power threshold, and the fuel consumption comprised in the status data of the target vehicle is less than or equal to the fuel threshold, it is indicated that the status data of the target vehicle is reasonable, and then it can be determined that the status data of the target vehicle is valid. Otherwise, it is indicated that the status data uploaded by the target vehicle may be abnormal, and then it can be determined that the status data of the target vehicle is invalid. If the status data of the target vehicle is valid, the status data of the target vehicle may be stored. If the status data of the target vehicle is invalid, the status data may be discarded, and then the status data of the target vehicle may be acquired again.

To sum up, in this disclosure, the control platform firstly acquires the location information sent by the target vehicle, wherein the location information comprises a target location; then determines the status data of at least one sample vehicle pre-stored by the control platform based on the target location, wherein the sample vehicle is a vehicle which has travelled through the target location; and finally determines the target driving mode based on the status data of the sample vehicle and sends the target driving mode to the target vehicle such that the target vehicle travels in the target driving mode. By determining a corresponding sample vehicle based on the location information of the target vehicle, and then determining a suitable target driving mode for the target vehicle to currently travel in based on the status data of the sample vehicle, this disclosure enables the target vehicle to travel in the target driving mode. The driver needs not to manually switch the driving mode, and the accuracy and convenience of controlling the drive mode are improved.

Figure 6:
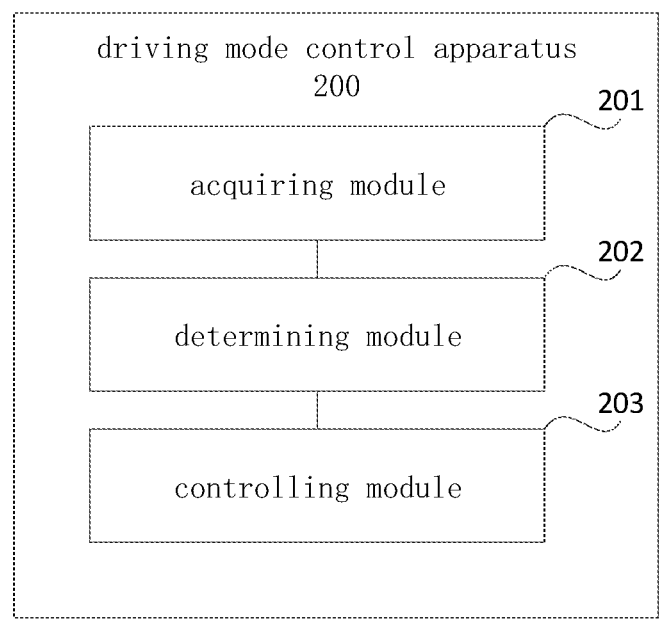
FIG. 6 is the block diagram of one driving mode control apparatus shown in accordance with one exemplary embodiment.

FIG. 6 is the block diagram of one driving mode control apparatus shown in accordance with one exemplary embodiment. As shown in FIG. 6, the apparatus 200 is for the control platform, and comprises:

an acquiring module 201, used for acquiring the location information sent by the target vehicle, wherein the location information comprises a target location;

a determining module 202, used for determining the status data of at least one sample vehicle pre-stored by the control platform based on the target location, wherein the sample vehicle is a vehicle which has travelled through the target location;

a controlling module 203, used for determining the target driving mode based on the status data of the sample vehicle and sending the target driving mode to the target vehicle such that the target vehicle travels in the target driving mode.

Figure 7:
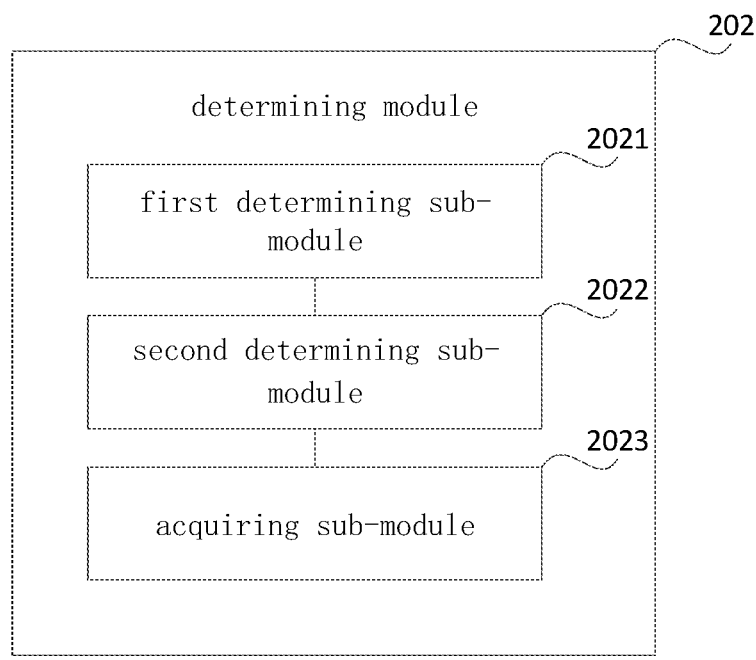
FIG. 7 is the block diagram of another driving mode control apparatus shown in accordance with one exemplary embodiment.

FIG. 7 is the block diagram of another driving mode control apparatus shown in accordance with one exemplary embodiment. As shown in FIG. 7, the determining module 202 comprises:

a first determining sub-module 2021, used for determining a target road segment involving the target location;

a second determining sub-module 2022, used for determining the sample vehicle which has travelled through the target road segment during a preset time period before a current time point;

a third determining sub-module 2023, used for acquiring the status data of the sample vehicle, wherein the status data comprises the driving mode, the power consumption or the fuel consumption of the sample vehicle when the sample vehicle is travelling through the target road segment.

Optionally, the driving mode is one of a plurality of driving modes and the sample vehicle is one of a plurality of sample vehicles, and the controlling module 203 is used for:

determining an average power consumption and an average fuel consumption corresponding to each one of the driving modes based on the status data of the plurality of sample vehicles;

determining an energy consumption corresponding to each one of the driving modes based on the average power consumption and the average fuel consumption corresponding to the each one of the driving modes;

determining the target driving mode based on the energy consumption corresponding to the each one of the driving modes.

Optionally, the controlling module 203 is used for:

for each one of the sample vehicles, determining the power consumption and the fuel consumption of the sample vehicle travelling in each one of the driving modes based on the status data of the sample vehicle;

determining a corresponding first weighting coefficient and a corresponding second weighting coefficient of the sample vehicle based on a travel time when the sample vehicle travelled through the target road segment;

determining the average power consumption corresponding to a first driving mode based on the power consumption of each one of the sample vehicles travelling in the first driving mode and the corresponding first weighting coefficient of the each one of the sample vehicles, wherein the first driving mode is any one of the driving modes;

determining the average fuel consumption corresponding to the first driving mode based on the fuel consumption of each one of the sample vehicles travelling in the first driving mode and the corresponding second weighting coefficient of the each one of the sample vehicles.

Optionally, the controlling module 203 is used for:

determining the power consumption time and the fuel consumption time of each one of the sample vehicles;

determining a third weighting coefficient and a fourth weighting coefficient based on the power consumption time and the fuel consumption time of the each one of the sample vehicles;

taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

Figure 8:
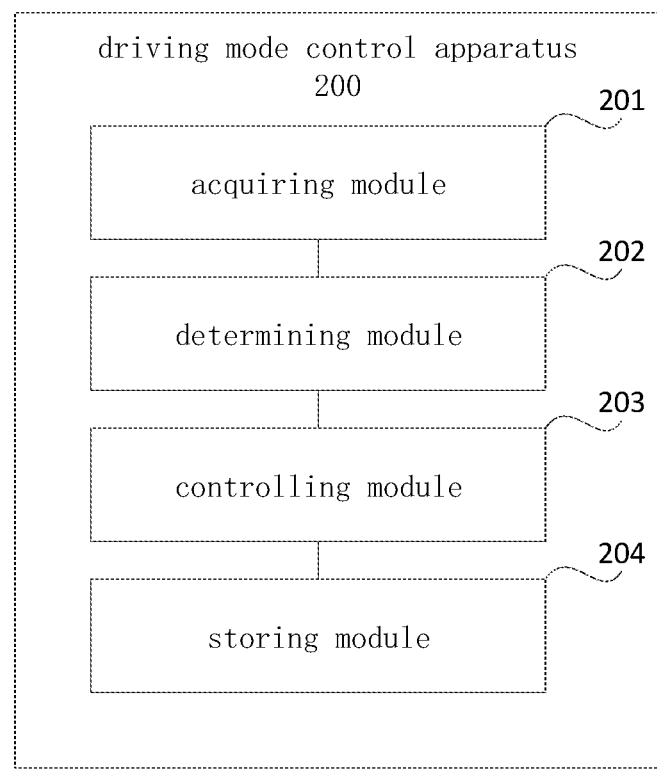
FIG. 8 is the block diagram of another driving mode control apparatus shown in accordance with one exemplary embodiment.

FIG. 8 is the block diagram of another driving mode control apparatus shown in accordance with one exemplary embodiment. As shown in FIG. 8, the apparatus 200 further comprises:

a storing module 204, used for acquiring the status data sent by the target vehicle and storing the status data of the target vehicle.

Figure 9:
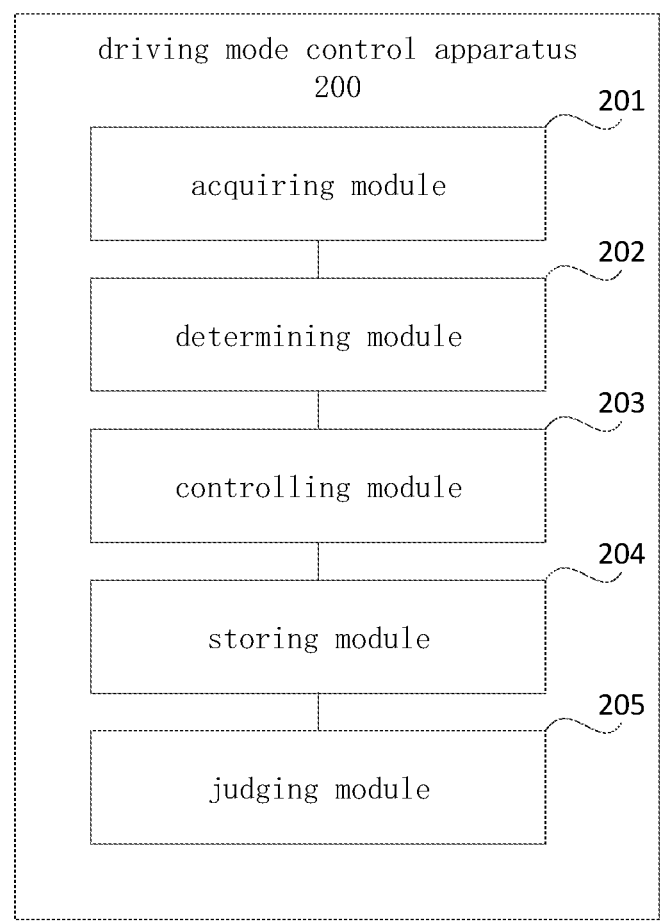
FIG. 9 is the block diagram of another driving mode control apparatus shown in accordance with one exemplary embodiment.

FIG. 9 is the block diagram of another driving mode control apparatus shown in accordance with one exemplary embodiment. As shown in FIG. 9, the apparatus 200 further comprises:

a judging module 205, used for determining whether the status data of the target vehicle is valid based on a preset power threshold and a preset fuel threshold prior to storing the status data of the target vehicle.

The judging module 205 is also used for determining that the status data of the target vehicle is valid if the power consumption comprised in the status data of the target vehicle is less than or equal to the power threshold and the fuel consumption comprised in the status data of the target vehicle is less than or equal to the fuel threshold.

The storing module 204 is used for:

storing the status data of the target vehicle if the status data of the target vehicle is valid.

With regard to the apparatus in the above embodiments, the specific manner in which each part performs its operation has been described in detail in the embodiments related to the method, and will not be described in detail here.

To sum up, in this disclosure, the control platform firstly acquires the location information sent by the target vehicle, wherein the location information comprises a target location; then determines the status data of at least one sample vehicle pre-stored by the control platform based on the target location, wherein the sample vehicle is a vehicle which has travelled through the target location; and finally determines the target driving mode based on the status data of the sample vehicle and sends the target driving mode to the target vehicle such that the target vehicle travels in the target driving mode. By determining a corresponding sample vehicle based on the location information of the target vehicle, and then determining a suitable target driving mode for the target vehicle to currently travel in based on the status data of the sample vehicle, this disclosure enables the target vehicle to travel in the target driving mode. The driver needs not to manually switch the driving mode, and the accuracy and convenience of controlling the drive mode are improved.

To implement the above embodiments, this disclosure further provides a computing processing device, comprising:
  a memory, in which a computer readable code is stored; and
  one or more processors, wherein when the computer readable code is executed by the one or more processors, the computing processing device implements the foregoing driving mode control method.

To implement the above embodiments, this disclosure further provides a computer program, comprising a computer readable code, which, when the computer readable code runs on a computing processing device, causes the computing processing device to implement the foregoing driving mode control method.

To implement the above embodiments, this disclosure further provides a computer readable storage medium, in which the foregoing computer program is stored.

Figure 10:
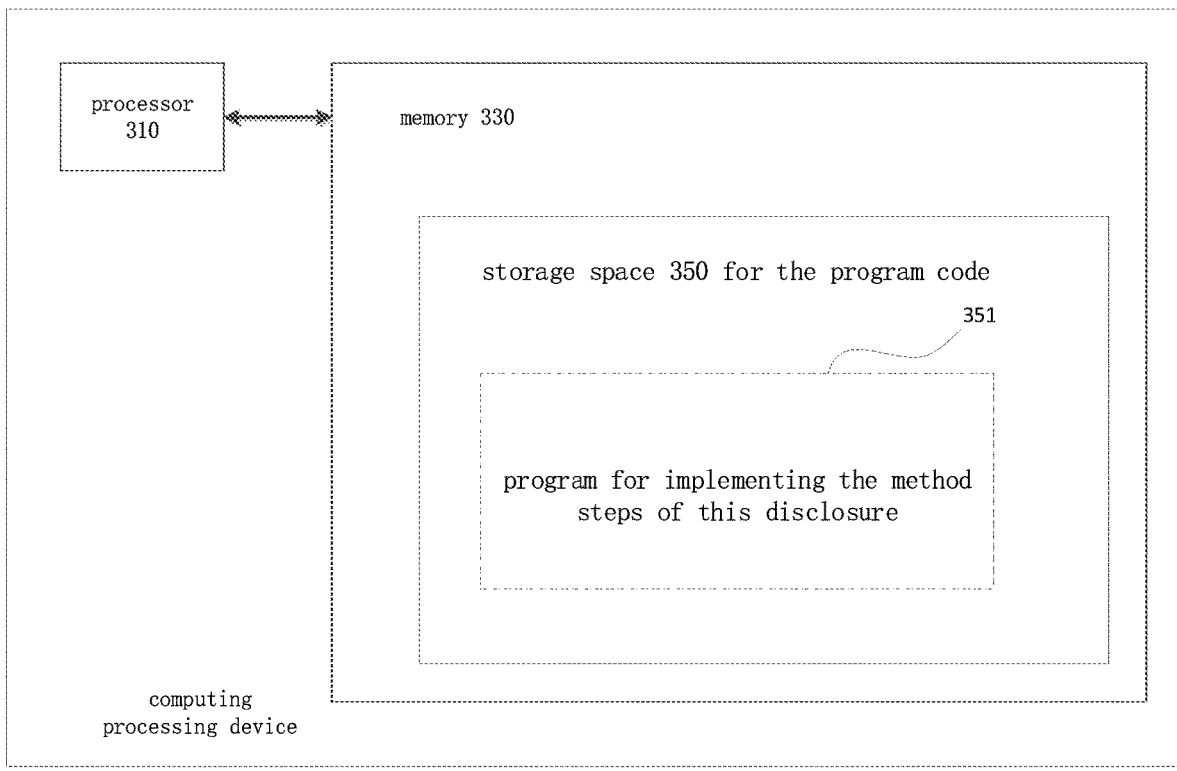
FIG. 10 is the structural schematic diagram of a computing processing device shown in accordance with one exemplary embodiment.
Figure 11:
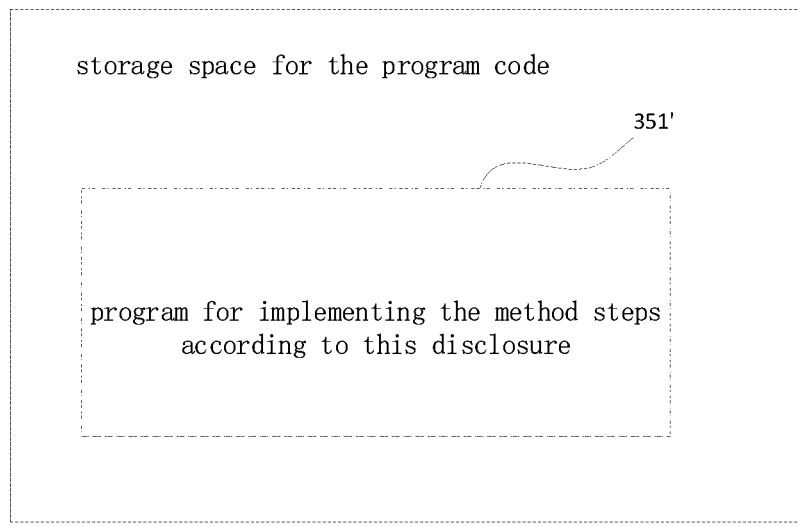
FIG. 11 is the schematic diagram of the storage unit for portably or fixedly implementing the program code of the method of this disclosure shown in accordance with one exemplary embodiment.

FIG. 10 is a structural schematic diagram of a computing processing device showing in accordance with an embodiment of this disclosure. The computing processing device generally comprises a processor 310 and a computer program product or computer readable medium in the form of a memory 330. The memory 330 may be an electronic memory such as a flash memory, an EEPROM (Electrically Erasable Programmable Read-Only Memory), an EPROM a hard disk, or a ROM. The memory 330 has a storage space 350 for the program code 351 for implementing any of the method steps described above, for example, the storage space 350 for the program code may include respective program codes 351 for implementing various steps in the above method. These program codes may be read out of or written into the one or more computer program products. These computer program products include program code carriers such as hard disks, compact disks (CD), memory cards, or floppy disks. Such a computer program product is typically a portable or fixed storage unit as shown in FIG. 11. The storage unit may have a storage segment, a storage space, and the like arranged similarly to the memory 330 in the server of FIG. 10. The program code may be compressed, for example, in an appropriate form. Generally, the storage unit includes a computer readable code 351', that is, a code that may be read by a processor such as 310 and that, when executed by the server, causes the server to implement the various steps in the method described above.

In the specification of this disclosure, descriptions with reference to terms such as "an embodiment", "some embodiments", "example", "a specific example", or "some examples" mean that specific features, structures, materials or characteristics that are described with reference to the embodiment or the example are contained in at least one embodiment or example of this disclosure. In the specification, schematic descriptions of the foregoing terms do not need to be specific to a same embodiment or example. Besides, the specific features, structures, materials or characteristics that are described may be properly combined in any one or more embodiments or examples. In addition, those skilled in the art may integrate or combine different embodiments or examples described in the specification and features of the different embodiments or examples as long as they are not contradictory to each other.

In addition, the terms "first" and "second" are merely intended for a purpose of description, and shall not be understood as an indication or implication of relative importance or implicit indication of a quantity of indicated technical features. Therefore, features limited by "first" or "second" may explicitly or implicitly include at least one of the features. In the description of this disclosure, "multiple" indicates at least two, for example, two, three, and so on, unless otherwise specified.

Any process or method described in the flowcharts or described in another manner herein may be construed as comprising one or more module, segment, or portion of code of executable instructions for implementing specified logical functions or process steps. In addition, the scope of the preferred implementation of this disclosure includes alternative implementations, in which the functions may occur out of the order shown or discussed, for example, the functions may be executed substantially concurrently, or may be executed in the reverse order, depending upon the functionality involved. This should be understood by those skilled in the art of the embodiments of this disclosure.

Logic and/or steps shown in the flowcharts or described herein in other manners, for example, may be considered as a program list of executable instructions that are used to implement logic functions, and may be implemented on any computer readable medium, for an instruction execution system, apparatus, or device (for example, a computer-based system, a system including a processor, or another system that can acquire instructions from the instruction execution system, apparatus, or device and execute the instructions) to use, or for a combination of the instruction execution system, apparatus, or device to use. In terms of the specification, the "computer readable medium" may be any apparatus that may include, store, communicate, propagate, or transmit programs, for the instruction execution system, apparatus, or device to use, or for a combination of the instruction execution system, apparatus, or device to use. More specific examples (this list is not exhaustive) of the computer readable medium include the following: an electrical part (an electrical apparatus) with one or more buses, a portable computer cartridge (an magnetic apparatus), a random-access memory (RAM), a read-only memory (ROM), an electrically erasable programmable read-only memory (EPROM), an optical fiber apparatus, and a compact disc read-only memory (CDROM). In addition, the computer readable medium may even be a piece of paper on which the programs can be printed or another appropriate medium. Because, for example, optical scanning may be performed on the paper or the another medium, then editing, decoding, or processing in other appropriate means when necessary, may be performed to obtain the programs in an electronic manner, and then the programs are stored in a computer memory.

It should be understood that each part of this disclosure can be implemented by using hardware, software, firmware, or a combination thereof. In the foregoing implementations, multiple steps or methods can be implemented by using software or firmware stored in a memory and executable by an appropriate instruction execution system. For example, if implemented by hardware, same as another implementation, the implementation may be implemented by using any one or a combination of the following technologies that are known in the art: a discrete logic circuit having a logic gate circuit configured to implement a logic function on a data signal, an application-specific integrated circuit having an appropriate combined logic gate circuit, a programmable gate array (PGA), a field programmable gate array (FPGA), or the like.

Those skilled in the art should understand that all or part of the steps of the method specified in any embodiment of this disclosure may be implemented by a program instructing relevant hardware. The program may be stored in a computer readable storage medium. When the program runs, the program executes one or more steps in the method embodiments of the present invention.

In addition, functional units in the embodiments of this disclosure may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated unit may be stored in a computer readable storage medium.

The foregoing storage medium may be a read-only memory, a magnetic disk or an optical disk. Although the embodiments of this disclosure are shown and described above, it can be understood that, the foregoing embodiments are exemplary, and cannot be construed as a limitation to this disclosure. Within the scope of this disclosure, those skilled in the art may make changes, modifications, replacement, and variations to the foregoing embodiments.

What is claimed is:

1. A driving mode control method for a control platform, comprising:
    the control platform acquiring a location information sent by a target vehicle,
        wherein the location information comprises a target location;
    the control platform determining a status data of at least one sample vehicle pre-stored by the control platform based on the target location, wherein the sample vehicle is a vehicle which has travelled through the target location;
    the control platform determining a suitable target driving mode for the target vehicle that travels currently based on the status data of the sample vehicle, and sending the target driving mode to the target vehicle that travels currently, wherein the control platform determining the status data of the at least one sample vehicle pre-stored by the control platform based on the target location comprises:
    the control platform determining a target road segment involving the target location;
    the control platform determining the sample vehicle which has travelled through the target road segment during a preset time period before a current time point; and
    the control platform acquiring the status data of the sample vehicle, wherein the status data of the sample vehicle comprises a driving mode, a power consumption, or a fuel consumption of the sample vehicle when the sample vehicle is travelling through the target road segment;
    wherein the driving mode is one of a plurality of driving modes and the sample vehicle is one of a plurality of sample vehicles, and the control platform determining the suitable target driving mode for the target vehicle that travels currently based on the status data of the sample vehicle comprises:
    the control platform determining an average power consumption and an average fuel consumption corresponding to each one of the plurality of driving modes based on the status data of the plurality of sample vehicles;
    the control platform determining an energy consumption corresponding to each one of the plurality of driving modes based on an average power consumption and an average fuel consumption corresponding to the each one of the plurality of driving modes; and
    the control platform determining the suitable target driving mode for the target vehicle that travels currently based on the energy consumption corresponding to the each one of the plurality of driving modes; and
    wherein the control platform determining the average power consumption and the average fuel consumption corresponding to the each one of the plurality of driving modes based on the status data of the plurality of sample vehicles comprises:
    for each one of the sample vehicles, the control platform determining the power consumption and the fuel consumption of the sample vehicle travelling in each one of the plurality of driving modes based on the status data of the sample vehicle;
    the control platform determining a corresponding first weighting coefficient and a corresponding second weighting coefficient of the sample vehicle based on a travel time when the sample vehicle travelled through the target road segment;
    the control platform determining the average power consumption corresponding to a first driving mode based on the power consumption of each one of the sample vehicles travelling in a first driving mode and the corresponding first weighting coefficient of the each one of the sample vehicles, wherein the first driving mode is any one of the plurality of driving modes; and
    the control platform determining the average fuel consumption corresponding to the first driving mode based on the fuel consumption of each one of the sample vehicles travelling in the first driving mode and the corresponding second weighting coefficient of the each one of the sample vehicles.

2. The method according to claim 1 wherein the control platform determining the energy consumption corresponding to each one of the driving modes based on the average power consumption and the average fuel consumption corresponding to the each one of the driving modes comprises:
    the control platform determining a power consumption time and a fuel consumption time of each one of the sample vehicles;
    the control platform determining a third weighting coefficient and a fourth weighting coefficient based on the power consumption time and the fuel consumption time of the each one of the sample vehicles;
    the control platform taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

3. The method according to claim 1, wherein the method further comprises: the control platform acquiring a status data sent by the target vehicle and storing the status data of the target vehicle.

4. The method according to claim 3, wherein prior to the control platform storing the status data of the target vehicle, the method further comprises: the control platform determining whether the status data of the target vehicle is valid based on a preset power threshold and a preset fuel threshold;
the control platform determining that the status data of the target vehicle is valid upon an occurrence of a condition that the power consumption comprised in the status data of the target vehicle is less than or equal to the power threshold and the fuel consumption comprised in the status data of the target vehicle is less than or equal to the fuel threshold;
the control platform storing the status data of the target vehicle, which comprises:
the control platform storing the status data of the target vehicle upon an occurrence of a condition that the status data of the target vehicle is valid.

5. A computing processing device, comprises:
a memory, in which a computer readable code is stored; and
one or more processors, wherein when the computer readable code is executed by the one or more processors, the computing processing device implements a driving mode control method;
wherein the method comprises: the one or more processors acquiring a location information sent by a target vehicle, wherein the location information comprises a target location;
the one or more processors determining a status data of at least one sample vehicle pre-stored by the one or more processors based on the target location, wherein the sample vehicle is a vehicle which has travelled through the target location;
the one or more processors determining a suitable target driving mode for the target vehicle that travels currently based on the status data of the sample vehicle, and sending the target driving mode to the target vehicle that travels currently, wherein the one or more processors determining the status data of the at least one sample vehicle pre-stored by the one or more processors based on the target location comprises:
the one or more processors determining a target road segment involving the target location;
the one or more processors determining the sample vehicle which has travelled through the target road segment during a preset time period before a current time point; and
the one or more processors acquiring the status data of the sample vehicle, wherein the status data comprises a driving mode, a power consumption, or a fuel consumption of the sample vehicle when the sample vehicle is travelling through the target road segment;
wherein the driving mode is one of a plurality of driving modes and the sample vehicle is one of a plurality of sample vehicles, and the one or more processors determining the suitable target driving mode for the target vehicle that travels currently based on the status data of the sample vehicle comprises: the one or more processors determining an average power consumption and an average fuel consumption corresponding to each one of the driving modes based on status data of the plurality of sample vehicles;
the one or more processors determining an energy consumption corresponding to each one of the driving modes based on the average power consumption and the average fuel consumption corresponding to the each one of the driving modes; and the one or more processors determining the suitable target driving mode for the target vehicle that travels currently based on the energy consumption corresponding to the each one of the driving modes; and
wherein the one or more processors determining the average power consumption and the average fuel consumption corresponding to the each one of the driving modes based on the status data of the plurality of sample vehicles comprises: for each one of the sample vehicles, the one or more processors determining the power consumption and the fuel consumption of the sample vehicle travelling in each one of the driving modes based on the status data of the sample vehicle;
the one or more processors determining a corresponding first weighting coefficient and a corresponding second weighting coefficient of the sample vehicle based on a travel time when the sample vehicle travelled through the target road segment;
the one or more processors determining the average power consumption corresponding to a first driving mode based on the power consumption of each one of the sample vehicles travelling in a first driving mode and the corresponding first weighting coefficient of the each one of the sample vehicles, wherein the first driving mode is any one of the driving modes; and
the one or more processors determining the average fuel consumption corresponding to the first driving mode based on the fuel consumption of each one of the sample vehicles travelling in the first driving mode and the corresponding second weighting coefficient of the each one of the sample vehicles.

6. A non-transitory computer readable storage medium, in which a computer program is stored, wherein the computer readable code causes a computing processing device to implement a driving mode control method when the computer readable code runs on the computing processing device, wherein the computing processing device comprises:
a memory in which the computer readable code is stored;
one or more processors, wherein when the computer readable code is executed by the one or more processors, the computing processing device implements the driving mode control method;
wherein the method comprises:
the one or more processors acquiring a location information sent by a target vehicle, wherein the location information comprises a target location;
the one or more processors determining a status data of at least one sample vehicle pre-stored by the one or more processors based on the target location, wherein the sample vehicle is a vehicle which has travelled through the target location;
the one or more processors determining a suitable target driving mode for the target vehicle based on the status data of the sample vehicle, and sending the suitable target driving mode to the target vehicle that travels currently, wherein the one or more processors determining the status data of the at least one sample vehicle pre-stored by the one or more processors based on the target location comprises: the one or more processors determining a target road segment involving the target location;

the one or more processors determining the sample vehicle which has travelled through the target road segment during a preset time period before a current time point; and the one or more processors acquiring the status data of the sample vehicle, wherein the status data comprises a driving mode, a power consumption or a fuel consumption of the sample vehicle when the sample vehicle is travelling through the target road segment;

wherein the driving mode is one of a plurality of driving modes and the sample vehicle is one of a plurality of sample vehicles, and the one or more processors determining the suitable target driving mode for the target vehicle that travels currently based on the status data of the sample vehicle comprises:

the one or more processors determining an average power consumption and an average fuel consumption corresponding to each one of the driving modes based on status data of the plurality of sample vehicles;

the one or more processors determining an energy consumption corresponding to each one of the driving modes based on the average power consumption and the average fuel consumption corresponding to the each one of the driving modes; and the one or more processors determining the suitable target driving mode for the target vehicle that travels currently based on the energy consumption corresponding to the each one of the driving modes; and wherein the one or more processors determining the average power consumption and the average fuel consumption corresponding to the each one of the driving modes based on the status data of the plurality of sample vehicles comprises: for each one of the sample vehicles, the one or more processors determining the power consumption and the fuel consumption of the sample vehicle travelling in each one of the driving modes based on the status data of the sample vehicle;

the one or more processors determining a corresponding first weighting coefficient and a corresponding second weighting coefficient of the sample vehicle based on a travel time when the sample vehicle travelled through the target road segment;

the one or more processors determining the average power consumption corresponding to a first driving mode based on the power consumption of each one of the sample vehicles travelling in a first driving mode and the corresponding first weighting coefficient of the each one of the sample vehicles, wherein the first driving mode is any one of the driving modes; and the one or more processors determining the average fuel consumption corresponding to the first driving mode based on the fuel consumption of each one of the sample vehicles travelling in the first driving mode and the corresponding second weighting coefficient of the each one of the sample vehicles.

7. The computing processing device according to claim 5, wherein the one or more processors determining the energy consumption corresponding to each one of the driving modes based on the average power consumption and the average fuel consumption corresponding to the each one of the driving modes comprises:

the one or more processors determining a power consumption time and a fuel consumption time of each one of the sample vehicles;

the one or more processors determining a third weighting coefficient and a fourth weighting coefficient based on the power consumption time and the fuel consumption time of the each one of the sample vehicles; and the one or more processors taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

8. The computing processing device according to claim 5, wherein the method further comprises: the one or more processors acquiring a status data sent by the target vehicle and storing the status data of the target vehicle.

9. The computing processing device according to claim 8, wherein prior to the one or more processors storing the status data of the target vehicle, the method further comprises: the one or more processors determining whether the status data of the target vehicle is valid based on a preset power threshold and a preset fuel threshold;

the one or more processors determining that the status data of the target vehicle is valid upon an occurrence of a condition that the power consumption comprised in the status data of the target vehicle is less than or equal to the power threshold and the fuel consumption comprised in the status data of the target vehicle is less than or equal to the fuel threshold; and the one or more processors storing the status data of the target vehicle, which comprises: the one or more processors storing the status data of the target vehicle upon an occurrence of a condition that the status data of the target vehicle is valid.

10. The non-transitory computer readable storage medium according to claim 6, wherein the one or more processors determining the energy consumption corresponding to each one of the driving modes based on the average power consumption and the average fuel consumption corresponding to the each one of the driving modes comprises:

the one or more processors determining a power consumption time and a fuel consumption time of each one of the sample vehicles;

the one or more processors determining a third weighting coefficient and a fourth weighting coefficient based on the power consumption time and the fuel consumption time of the each one of the sample vehicles; and the one or more processors taking a sum of a product of the average power consumption corresponding to each one of the driving modes and the third weighting coefficient and a product of the average fuel consumption corresponding to each one of the driving modes and the fourth weighting coefficient as the energy consumption corresponding to the each one of the driving modes.

11. The non-transitory computer readable storage medium according to claim 6, wherein the method further comprises: the one or more processors acquiring a status data sent by the target vehicle and storing the status data of the target vehicle.

* * * * *